(12) United States Patent
He et al.

(10) Patent No.: US 12,014,264 B2
(45) Date of Patent: Jun. 18, 2024

(54) DATA PROCESSING CIRCUIT FOR NEURAL NETWORK

(71) Applicant: HUAWEI TECHNOLOGIES CO., LTD., Guangdong (CN)

(72) Inventors: Zhanying He, Hangzhou (CN); Bin Xu, Hangzhou (CN); Honghui Yuan, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 965 days.

(21) Appl. No.: 17/005,488

(22) Filed: Aug. 28, 2020

(65) Prior Publication Data

US 2020/0394507 A1 Dec. 17, 2020

Related U.S. Application Data

(63) Continuation of application No. PCT/CN2019/076443, filed on Feb. 28, 2019.

(30) Foreign Application Priority Data

Mar. 1, 2018 (CN) .......................... 201810171695.8

(51) Int. Cl.
*G06F 7/556* (2006.01)
*G06F 7/485* (2006.01)
(Continued)

(52) U.S. Cl.
CPC ............. *G06N 3/063* (2013.01); *G06F 7/485* (2013.01); *G06F 7/4876* (2013.01); *G06F 7/556* (2013.01);
(Continued)

(58) Field of Classification Search
CPC .. G06F 7/57–575; G06F 7/556; G06F 1/0307; G06F 2207/4824; G06N 3/063
See application file for complete search history.

(56) References Cited

U.S. PATENT DOCUMENTS

| 5,434,951 A | 7/1995 | Kuwata |
| 2006/0101242 A1* | 5/2006 | Siu ...................... G06F 9/30021 712/221 |

(Continued)

FOREIGN PATENT DOCUMENTS

| CN | 105892989 A | 8/2016 |
| CN | 105930902 A | 9/2016 |

(Continued)

OTHER PUBLICATIONS

Intel Corporation, "DSP Builder for Intel FPGAs Introduction", Document ID 683697, version 17-0, 2017 (Year: 2017).*

(Continued)

*Primary Examiner* — Matthew D Sandifer
(74) *Attorney, Agent, or Firm* — WHDA, LLP

(57) ABSTRACT

A data processing circuit is disclosed. The data processing circuit relates to the field of digital circuits, and includes a first computing circuit and an input control circuit. The first computing circuit includes one or more computing sub-circuits. Each computing sub-circuit includes a first addition operation circuit, a multiplication operation circuit, a first comparison operation circuit, and a first nonlinear operation circuit. The first nonlinear operation circuit includes at least one of an exponential operation circuit and a logarithmic operation circuit. The input control circuit is configured to: control the first computing circuit to read input data and an input parameter, and control, according to a received first instruction, the operation circuit in the computing sub-circuit included in the first computing circuit, to perform an operation on the input data and the input parameter.

18 Claims, 9 Drawing Sheets

(51) Int. Cl.
  *G06F 7/487* (2006.01)
  *G06F 7/57* (2006.01)
  *G06N 3/063* (2023.01)

(52) U.S. Cl.
  CPC ........ *G06F 7/57* (2013.01); *G06F 2207/4824* (2013.01)

(56) References Cited

U.S. PATENT DOCUMENTS

| | | | | |
|---|---|---|---|---|
| 2014/0067889 | A1* | 3/2014 | Mortensen | G06F 7/57 708/517 |
| 2016/0342891 | A1 | 11/2016 | Ross et al. | |
| 2019/0026626 | A1* | 1/2019 | Du | G06F 7/57 |
| 2021/0182077 | A1* | 6/2021 | Chen | G06T 7/20 |

FOREIGN PATENT DOCUMENTS

| | | |
|---|---|---|
| CN | 106127302 A | 11/2016 |
| CN | 106228238 A | 12/2016 |
| CN | 106355246 A | 1/2017 |
| CN | 109521994 A | 3/2019 |

OTHER PUBLICATIONS

International Search Report dated May 29, 2019, issued in counterpart Application No. PCT/CN2019/076443, with English Translation. (10 pages).

H. Djahanshahi et al, A Modular Architecture for Hybrid VLSI Neural Networks and its Application in a Smart Photosensor, IEEE, 1996. (6 pages).

Jihong Liu et al, A Survey of FPGA-Based Hardware Implementation of ANNS, IEEE, 2005. (4 pages).

Extended (Supplementary) European Search Report dated Apr. 6, 2021, issued in counterpart EP Application No. 19761361.5. (7 pages).

* cited by examiner

DATA PROCESSING CIRCUIT FOR NEURAL NETWORK

CROSS-REFERENCE TO RELATED APPLICATIONS

This application is a continuation of International Application No. PCT/CN2019/076443, filed on Feb. 28, 2019, which claims priority to Chinese Patent Application No. 201810171695.8, filed on Mar. 1, 2018[H], The disclosures of the aforementioned applications are hereby incorporated by reference in their entireties.

TECHNICAL FIELD

The present invention relates to the field of digital circuits, and in particular, to data processing for a neural network.

BACKGROUND

A neural network processor mainly includes three modules: a computing engine, a control module, and a storage module. To adapt to a high-density computing amount of a neural network, the computing engine is usually adapted to a convolution layer and a fully connected layer that carry more than 90% of the computing amount of the neural network, that is, the computing engine is applicable to a multiplication and accumulation operation for a large data volume. For another type of operation, the neural network processor reports, to a CPU (Central Processing Unit), data that needs to be processed, and after completing computing, the CPU delivers an obtained data result to the neural network processor. For each computation at a neural network layer other than the convolution layer and the fully connected layer, data needs to be transmitted back and forth between the neural network processor and the CPU, and a transmission delay arising from this greatly decreases efficiency of performing neural-network-related computing by the neural network processor.

SUMMARY

Embodiments of the present invention provide a data processing circuit for neural network computing, to adapt to computing at more types of neural network layers and further reduce a delay arising from data exchange between a data processing circuit and a CPU.

To describe the present invention in detail, the following terms, acronyms, or symbols are used:
PLD: Programmable Logic Device;
FPGA: Field Programmable Gate Array;
LRN: Local Response Normalization;
ROM: Read-Only Memory, read-only memory;
RAM: Random Access Memory;
I/O: Input and Output, input and output; and
IP core: Intellectual Property core, used for a pre-designed circuit function module in an application-specific integrated circuit or an FPGA.

In the embodiments of the present invention, an operation includes performing a multiplication operation, an addition operation, a logarithmic operation, a comparison operation, pass-through processing, or the like on data or a parameter.

In the embodiments of the present invention, the pass-through processing includes directly outputting data or a parameter through a conductive circuit such as a conductor or a semiconductor switch, or storing data or a parameter by using a storage device such as a register or a latch and outputting the data or the parameter.

In the embodiments of the present invention, programmable logic devices include a GAL (Generic Array Logic, generic array logic), a CPLD (Complex PLD, complex PLD), and an FPGA.

According to a first aspect, an embodiment of the present invention provides a data processing circuit, including: a first computing circuit and an input control circuit, where the first computing circuit includes one or more computing sub-circuits; each computing sub-circuit includes a first addition operation circuit, a multiplication operation circuit, a first comparison operation circuit, a first pass-through circuit, and a first nonlinear operation circuit; the first nonlinear operation circuit includes at least one of an exponential operation circuit and a logarithmic operation circuit; and the input control circuit is configured to control the first computing circuit to read input data and an input parameter, receive a first instruction, and control, according to the first instruction, the one or more computing sub-circuits in the first computing circuit to perform a data operation on the input data and the input parameter by using one of or a combination of a plurality of the foregoing operation circuits and output a first operation result.

Because the input control circuit may control, by using the first instruction, the first computing circuit to implement one of or a combination of a plurality of a logarithmic operation, an exponential operation, pass-through processing, an addition operation, a comparison operation, and a multiplication operation, the data processing circuit can complete a more complex operation mode, so that computing can be performed at more types of neural network layers in the data processing circuit. Accordingly, this reduces a quantity of types of neural network layers that need to be processed by a CPU, and therefore reduces frequency of data exchange between the data processing circuit and the CPU, thereby reducing a delay arising from this and improving computing efficiency for a neural network.

In an implementation, the input control circuit converts the received first instruction into a control signal, and controls, by using the control signal, the first computing circuit to perform the data operation.

In an implementation, the input data includes first input data and second input data.

In an implementation, the first nonlinear operation circuit is configured to perform a logarithmic operation or an exponential operation on the first input data; the first pass-through circuit is configured to directly output the first input data, the multiplication operation circuit is configured to perform a multiplication operation on the input parameter and an operation result of the first nonlinear operation circuit, or perform a multiplication operation on the input parameter and a result output by the first pass-through circuit; the first addition operation circuit is configured to perform an addition operation on an operation result of the multiplication operation circuit and the second input data; and the first comparison operation circuit is configured to perform a comparison operation on the operation result of the multiplication operation circuit and the second input data. A combination of a plurality of operation modes enables a computing sub-circuit to perform an operation on data in a more flexible manner, thereby adapting to a more complex operation mode.

In an implementation, the input control circuit is configured to enable, according to the first instruction, one of the first nonlinear operation circuit and the first pass-through circuit to participate in the data operation, and enable one of the first addition operation circuit and the first comparison operation circuit to participate in the data operation.

In an implementation, each computing sub-circuit further includes a second nonlinear operation circuit and a second pass-through circuit, where the second nonlinear operation circuit includes at least one of the exponential operation circuit and the logarithmic operation circuit, the second pass-through circuit is configured to directly output an operation result of the first addition operation circuit or an operation result of the first comparison operation circuit, the second nonlinear operation circuit is configured to perform a logarithmic operation or an exponential operation on the operation result of the first addition operation circuit or the operation result of the first comparison operation circuit, and the input control circuit is further configured to enable, according to the first instruction, one of the second nonlinear operation circuit and the second pass-through circuit to participate in the data operation. In combination with the second nonlinear operation circuit and the second pass-through circuit, the computing sub-circuit can perform two logarithmic operations and/or exponential operations on data in one computation, thereby greatly improving a computing capability of the computing sub-circuit.

In an implementation, the first nonlinear operation circuit is the logarithmic operation circuit, and the second nonlinear operation circuit is the exponential operation circuit. The computing sub-circuit first performs a logarithmic operation on the first input data, and then performs an exponential operation on an output result of the comparison operation circuit or the addition operation circuit, so that a common operation such as a power operation can be implemented in a computation, thereby improving computing efficiency.

In an implementation, the logarithmic operation circuit is an encoder. The logarithmic operation circuit implements a logarithmic operation by encoding data, thereby simplifying a structure of the logarithmic operation circuit.

In an implementation, the exponential operation circuit is a decoder. The exponential operation circuit implements an exponential operation by decoding data, thereby simplifying a structure of the exponential operation circuit.

In an implementation, the first computing circuit further includes a shielding circuit, configured to receive an operation result of the one or more computing sub-circuits under control of the input control circuit, and output the operation result of the one or more computing sub-circuits that is obtained through shielding processing. The shielding circuit can implement a local summation operation, to adapt to a more complex operation mode.

In an implementation, the shielding circuit is a selector.

In an implementation, the first computing circuit further includes an output computing circuit, including a second addition operation circuit, a second comparison operation circuit, and a third pass-through circuit, where the second addition operation circuit is configured to perform an addition operation on the result output by the shielding circuit, and output an addition operation result; the second comparison operation circuit is configured to perform a comparison operation on the result output by the shielding circuit, and output a comparison operation result; the third pass-through circuit is configured to directly output the result output by the shielding circuit; and the input control circuit is further configured to enable, according to the first instruction, one of the second addition operation circuit, the second comparison operation circuit, and the third pass-through circuit to process the result output by the shielding circuit.

In an implementation, the data processing circuit further includes: a data caching circuit and a parameter caching circuit, where the data caching circuit is configured to cache the input data and output the input data to the first computing circuit, and the parameter caching circuit is configured to cache the input parameter and output the input parameter to the first computing circuit. The data caching circuit and the parameter caching circuit can improve a speed of reading data and a parameter by the first computing circuit.

In an implementation, the data processing circuit further includes an output control circuit, configured to cache the first operation result output by the first computing circuit, and output the first operation result.

In an implementation, the data processing circuit further includes a second computing circuit used for a multiplication and accumulation operation, where the input control circuit controls the second computing circuit to read the input data and the input parameter; the input control circuit is further configured to receive a second instruction, and control, according to the second instruction, the second computing circuit to perform a multiplication and accumulation operation and output a second operation result; and the output control circuit is further configured to cache the second operation result output by the second computing circuit, and output the second operation result. The second computing circuit is dedicated for a multiplication and accumulation operation, thereby fully utilizing hardware resources and improving computing efficiency of the data processing circuit.

According to a second aspect, an embodiment of the present invention provides a data processing method, applied to the data processing circuit in the first aspect and the possible implementations of the first aspect. The data processing method includes:

controlling, by an input control circuit, a first computing circuit to read input data and an input parameter; and receiving, by the input control circuit, a first instruction, and controlling, according to the first instruction, one or more computing sub-circuits in the first computing circuit to perform a data operation on the input data and the input parameter by using one of or a combination of a plurality of a first addition operation circuit, a multiplication operation circuit, a first comparison operation circuit, a first pass-through circuit, and a first nonlinear operation circuit, and output a first operation result.

Because the input control circuit may control, by using the first instruction, the first computing circuit to implement one of or a combination of a plurality of a logarithmic operation, an exponential operation, pass-through processing, an addition operation, a comparison operation, and a multiplication operation, the data processing circuit can complete a more complex operation mode, so that computing can be performed at more types of neural network layers in the data processing circuit. Accordingly, this reduces a quantity of types of neural network layers that need to be processed by a CPU, and therefore reduces frequency of data exchange between the data processing circuit and the CPU, thereby reducing a delay arising from this and improving computing efficiency for a neural network.

In an implementation, the input control circuit converts the received first instruction into a control signal, and controls, by using the control signal, the first computing circuit to perform the data operation.

In an implementation, the step of controlling, by the input control circuit according to the first instruction, the first computing circuit to perform a data operation on the input data and the input parameter includes: controlling, by the input control circuit according to the first instruction, the first computing circuit to perform a nonlinear operation on first input data or directly output first input data, where the nonlinear operation includes a logarithmic operation and an exponential operation; controlling, by the input control circuit according to the first instruction, the first computing circuit to perform a multiplication operation on the foregoing result and the input parameter; and controlling, by the input control circuit according to the first instruction, the first computing circuit to perform an addition operation or a comparison operation on the foregoing result and second input data.

In an implementation, the input control circuit controls, according to the first instruction, the first computing circuit to perform a nonlinear operation on an operation result of the addition operation or the comparison operation, or directly output the foregoing result, where the nonlinear operation includes a logarithmic operation and an exponential operation.

In an implementation, the input control circuit controls, according to the first instruction, the first computing circuit to perform a logarithmic operation on the first input data, and perform an exponential operation on an operation result of the addition operation or the comparison operation.

In an implementation, the logarithmic operation is an encoding operation.

In an implementation, the exponential operation is a decoding operation.

In an implementation, the step of controlling, by the input control circuit according to the first instruction, the first computing circuit to perform a data operation on the input data and the input parameter further includes: controlling, by the input control circuit according to the first instruction, a shielding circuit to receive an operation result of the one or more computing sub-circuits, perform shielding on the operation result, and output the operation result of the one or more computing sub-circuits that is obtained through shielding processing.

In an implementation, the input control circuit controls, according to the first instruction, a selector to perform selection on an operation result of the one or more computing sub-circuits.

In an implementation, the step of controlling, by the input control circuit according to the first instruction, the first computing circuit to perform a data operation on the input data and the input parameter further includes: controlling, by the input control circuit according to the first instruction, an output computing circuit to perform an addition operation or a comparison operation on the operation result output by the shielding circuit, or directly output the operation result output by the shielding circuit.

In an implementation, the input control circuit caches the input data to a data caching circuit, and the first computing circuit reads the input data from the data caching circuit; and the input control circuit caches the input parameter to a parameter caching circuit, and the first computing circuit reads the input parameter from the parameter caching circuit.

In an implementation, the output control circuit caches the first operation result output by the first computing circuit, and outputs the first operation result.

In an implementation, the input control circuit controls a second computing circuit to read the input data and the input parameter; the input control circuit is further configured to receive a second instruction, and control, according to the second instruction, the second computing circuit to perform a multiplication and accumulation operation on the input data and the input parameter and output a second operation result; and the output control circuit is further configured to cache the second operation result output by the second computing circuit, and output the second operation result. The second computing circuit is dedicated for a multiplication and accumulation operation, thereby fully utilizing hardware resources and improving computing efficiency of the data processing circuit.

According to a third aspect, an embodiment of the present invention provides a data processing apparatus, including a programmable logic device and a storage device. The storage device is configured to store configuration data. The programmable logic device is configured to read the configuration data in the storage device, and configure, based on the configuration data, a plurality of logical blocks in the programmable logic device. The plurality of logical blocks are configured as the data processing circuit in the first aspect and the possible implementations of the first aspect.

Because an input control circuit may control, by using a first instruction, a first computing circuit to implement one of or a combination of a plurality of a logarithmic operation, an exponential operation, pass-through processing, an addition operation, a comparison operation, and a multiplication operation, the data processing circuit can complete a more complex operation mode, so that computing can be performed at more types of neural network layers in the data processing circuit. Accordingly, this reduces a quantity of types of neural network layers that need to be processed by a CPU, and therefore reduces frequency of data exchange between the data processing circuit and the CPU, thereby reducing a delay arising from this and improving computing efficiency for a neural network.

According to a fourth aspect, an embodiment of the present invention provides a storage medium, configured to store configuration data. A programmable logic device reads the configuration data in the storage medium and configures, based on the configuration data, a plurality of logical blocks in the programmable logic device. The plurality of logical blocks are configured as the data processing circuit in the first aspect and the possible implementations of the first aspect.

Because an input control circuit may control, by using a first instruction, a first computing circuit to implement one of or a combination of a plurality of a logarithmic operation, an exponential operation, pass-through processing, an addition operation, a comparison operation, and a multiplication operation, the data processing circuit can complete a more complex operation mode, so that computing can be performed at more types of neural network layers in the data processing circuit. Accordingly, this reduces a quantity of types of neural network layers that need to be processed by a CPU, and therefore reduces frequency of data exchange between the data processing circuit and the CPU, thereby reducing a delay arising from this and improving computing efficiency for a neural network.

According to a fifth aspect, an embodiment of the present invention provides a storage medium, configured to store a source file. The source file is read, and is converted into the data processing circuit in the first aspect and the possible implementations of the first aspect by an integrated circuit design and production device. Because an input control circuit may control, by using a first instruction, a first computing circuit to implement one of or a combination of a plurality of a logarithmic operation, an exponential operation, pass-through processing, an addition operation, a comparison operation, and a multiplication operation, the data processing circuit can complete a more complex operation mode, so that computing can be performed at more types of neural network layers in the data processing circuit. Accordingly, this reduces a quantity of types of neural network layers that need to be processed by a CPU, and therefore reduces frequency of data exchange between the data processing circuit and the CPU, thereby reducing a delay arising from this and improving computing efficiency for a neural network.

BRIEF DESCRIPTION OF DRAWINGS

To describe the technical solutions in the embodiments of the present invention more clearly, the following briefly describes the accompanying drawings required for describing the embodiments or the related art.

DESCRIPTION OF EMBODIMENTS

The following clearly describes the technical solutions in the embodiments of the present invention with reference to the accompanying drawings in the embodiments of the present invention.

Figure 1:
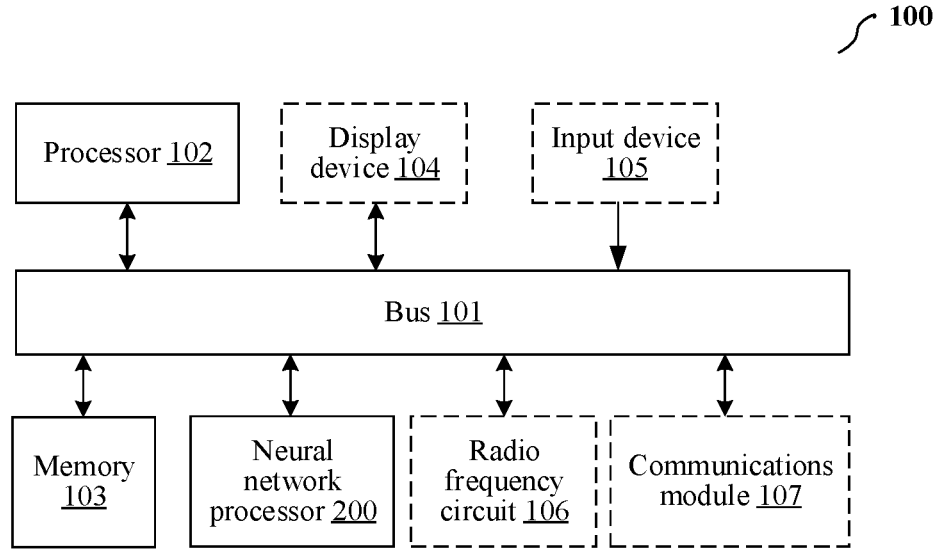
FIG. 1 is a schematic diagram of an electronic device for a neural network according to an embodiment of the present invention.

In the embodiments of the present invention, an electronic device 100, shown in FIG. 1, used for neural network computing is used as an example. The electronic device 100 includes a processor 102, a memory 103, and a neural network processor 200. The electronic device 100 may be a printed circuit board (Printed Circuit Board, PCB), an integrated circuit (Integrated Circuit, IC), or a communications device such as a mobile phone or a portable computer. In an implementation, the processor 102, the memory 103, and the neural network processor 200 are disposed on a PCB board as three separate devices. In another implementation, the processor 102, the memory 103, and the neural network processor 200 are integrated or encapsulated on an IC. It can be understood that the foregoing three parts may be integrated or separated as required. For example, the processor 102 and the neural network processor 200 may be integrated or encapsulated on an application-specific integrated circuit (Application-Specific Integrated Circuit, ASIC), and then disposed on a PCB board together with the memory 103. The processor 102, the memory 103, and the neural network processor 200 are communicatively coupled to each other, and are in a high-speed data transmission connection. The high-speed data transmission connection may be implemented by a bus 101 that is communicatively connected to the processor 102, the memory 103, and the neural network processor 200 each. The bus 101 can be an AXI (Advanced eXtensible Interface) bus protocol or another bus protocol. The processor 102 may be a central processing unit (Central Processing Unit, CPU), configured to run a software program and/or an instruction stored in the memory 103, to perform various functions of the electronic device 100. The CPU may be a CPU based on an X86 architecture, an ARM architecture, or a cortex-A architecture. The memory 103 may include a volatile memory such as a random access memory (Random Access Memory, ROM); or may include a nonvolatile memory such as a flash memory (flash memory), a hard disk drive, or a solid-state drive (Solid-State Drive, SSD); or may be a combination of the foregoing types of memories. The neural network processor 200 may be a standalone hardware chip, or may be a computing circuit, such as an IP (Intellectual Property, intellectual property) core, that is integrated in a hardware chip with the processor 102. The one or more hardware chips may be an ASIC, a programmable logic device (Programmable Logic Device, PLD), or a combination of the foregoing types of hardware chips. The PLD may be a field programmable gate array (Field Programmable Gate Array, FPGA), a generic array logic (Generic Array Logic, GAL), or the like.

Optionally, the electronic device 100 further includes a display device 104, an input device 105, a radio frequency circuit 106, and a communications module 107. The display device 104 is configured to output a visual text, graphic, and video, and any combination thereof. The display device 104 may be an LCD (Liquid Crystal Display, liquid crystal display) or an LPD (Laser Phosphor Display). A user may input a command and information, such as to-be-identified image data or audio data, to the electronic device 100 by using the input device 105. The input device 105 may be a mouse, a keyboard, a scanner, a camera, or the like. The radio frequency circuit 106 is configured to send and receive an electromagnetic wave, transform an electrical signal into an electromagnetic wave or transform an electromagnetic wave into an electrical signal, and communicate with a communications network or another communications device through an electromagnetic wave. The communications module 107 is configured to process communication data, for example, communication data represented by an electrical signal into which the radio frequency circuit 106 transforms a received electromagnetic wave.

In an implementation, the bus 101 in the electronic device 100 communicatively connects the processor 102, the memory 103, and the neural network processor 200 to form a data channel. The processor 102 controls, through the bus 101, the neural network processor 200 to start neural network computing. When completing the neural network computing, the neural network processor 200 notifies, through the bus 101, the processor 102 that the computing ends. The neural network processor 200 obtains, from the memory 103 through the bus 101, input data, an input parameter, and an instruction that are used for neural network computing. The input data includes neural network data that requires computing, for example, to-be-identified image data and audio data. The input parameter includes a parameter used for neural network computing, for example, a neural network parameter obtained through offline training. The instruction includes information indicating a neural network layer. The neural network processor 200 configures a computing mode for a corresponding neural network layer according to the instruction. The computing mode may include an operation such as multiplication, accumulation, or evolution, or a combination of the operations. In this embodiment of the present invention, the neural network processor 200 may process computing at a plurality of types of neural network layers, for example, neural network layers such as a convolution (Convolution) layer, a fully connected layer, a pooling layer, and a normalization layer.

A neural network may include a plurality of types of neural network layers, and a same type of neural network layer may appear in the neural network for a plurality of times. For example, neural network layers required for identifying an image include: a convolution layer, a sigmoid layer, a pooling layer, a sigmoid layer, a pooling layer, and a fully connected layer. The neural network layers include two sigmoid layers and two pooling layers. In neural network computing, the neural network processor 200 sequentially performs computing at each neural network layer, and a computing result for a current neural network layer may be used as input for computing at a next neural network layer. In the foregoing example, input data at the convolution layer includes input data and an input parameter of an image, and a computing result obtained through computing at the convolution layer is used as input data for the sigmoid layer.

In a complete computing process at a neural network layer, the neural network processor 200 first reads, from the memory 103 through the bus 101, input data, an input parameter, and an instruction that need to be processed. During computing at different neural network layers, computing needs to be performed on data in different modes, and therefore the input parameter and the instruction that are read are related to a type of a specific neural network layer. The neural network processor 200 performs computing on the input data and the input parameter according to a corresponding instruction. An obtained computing result is written into the memory 103 through the bus 101. The computing result is used as data required for computing at a subsequent neural network layer. In computing at a next neural network layer, the neural network processor 200 reads input data and an input parameter from the memory 103 through the bus 101 again. The read input data may include the computing result of the previous neural network layer or data that has not undergone computing.

Figure 2:
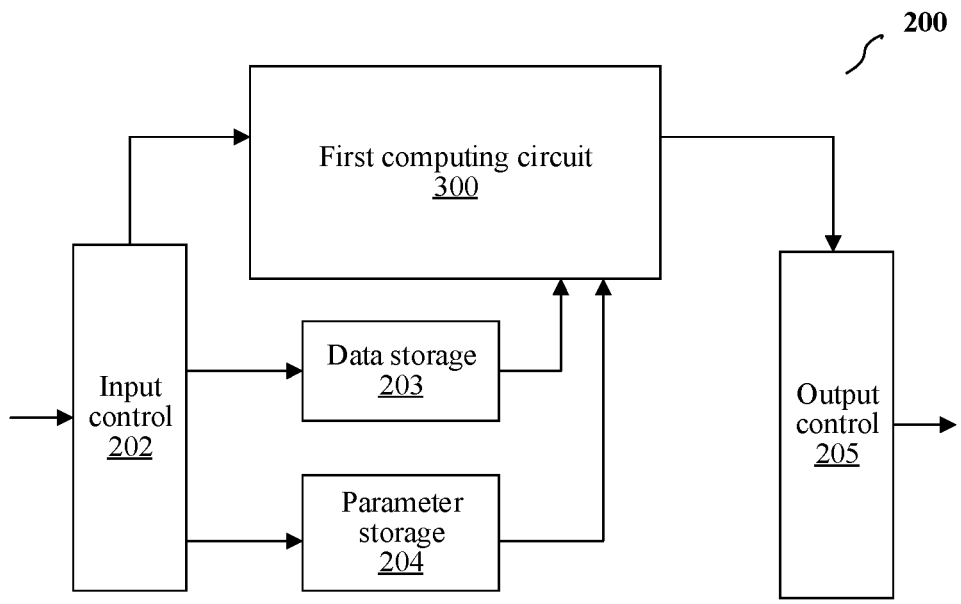
FIG. 2 is a schematic diagram of a neural network processor according to an embodiment of the present invention.

FIG. 2 shows a neural network processor 200 according to an embodiment of the present invention. The neural network processor 200 includes an input control circuit 202, a data storage circuit 203, a parameter storage circuit 204, an output control circuit 205, and a first computing circuit 300. The input control circuit 202 receives input data, an input parameter, and a first instruction. The input data, the input parameter, and the first instruction may come from a memory 103, and specifically, may be transmitted through a data channel (for example, a bus 101) between the memory 103 and the neural network processor 200. In an implementation, the input control circuit 202 caches the received input data and input parameter to the data storage circuit 203 and the parameter storage circuit 204 respectively, and controls the first computing circuit 300 to read the input data in the data storage circuit 203 and the input parameter in the parameter storage circuit 204. In another implementation, the input control circuit 202 directly controls the first computing circuit 300 to read the input data and the input parameter in the memory 103. The input control circuit 202 further converts the first instruction into a control signal by using an instruction parsing circuit included in the input control circuit 202, to control the first computing circuit 300 to perform computing by using a neural network layer computing mode corresponding to the first instruction.

The input data cached in the data storage circuit 203 may be data that requires computing during computing at a current neural network layer, for example, to-be-identified input image data or audio data. The input parameter cached in the parameter storage circuit 204 is a parameter that participates in the computing at the current neural network layer, for example, a neural network parameter obtained through offline training. The data storage circuit 203 and the parameter storage circuit 204 may be a BRAM (Block Random-Access Memory, block RAM), a DRAM (distributed Random-Access Memory, distributed RAM), or another type of storage circuit.

The output control circuit 205 receives a first operation result output by the first computing circuit 300, and outputs the first operation result to the memory 103. Specifically, if the memory 103 is designed to be disposed outside the neural network processor 200, the output control circuit 205 may store the first operation result to the memory 103 through the bus 101. In an implementation, the input control circuit 202 and the output control circuit 205 each may further include a standalone storage circuit such as a distributed register, configured to cache a temporary result generated through computing inside the circuit. For example, the output control circuit 205 receives and caches the first operation result generated by the first computing circuit 300, and outputs the first operation result.

A neural network model usually includes a plurality of neural network layers, for example, a convolution layer, a fully connected layer, an LRN (Local Response Normalization, local response normalization) layer, a normalization layer, and a pooling layer. A computing mode for the convolution layer and the fully connected layer is fixed, and usually includes massive multiplication and accumulation operations. At other neural network layers such as the LRN layer, the normalization layer, and the pooling layer, more flexible and complex computing is required, for example, a power operation, a division operation, and local summation. The first computing circuit 300 in the neural network processor 200 not only can implement massive multiplication and accumulation operations, but also can implement computing in other modes, such as a power operation, a division operation, and local summation. This meets a requirement for the neural network processor 200 to perform computing at more types of neural network layers, thereby saving much time required for data exchange between the neural network processor 200 and a processor 102, and improving an operating speed of neural network application computing.

Figure 3:
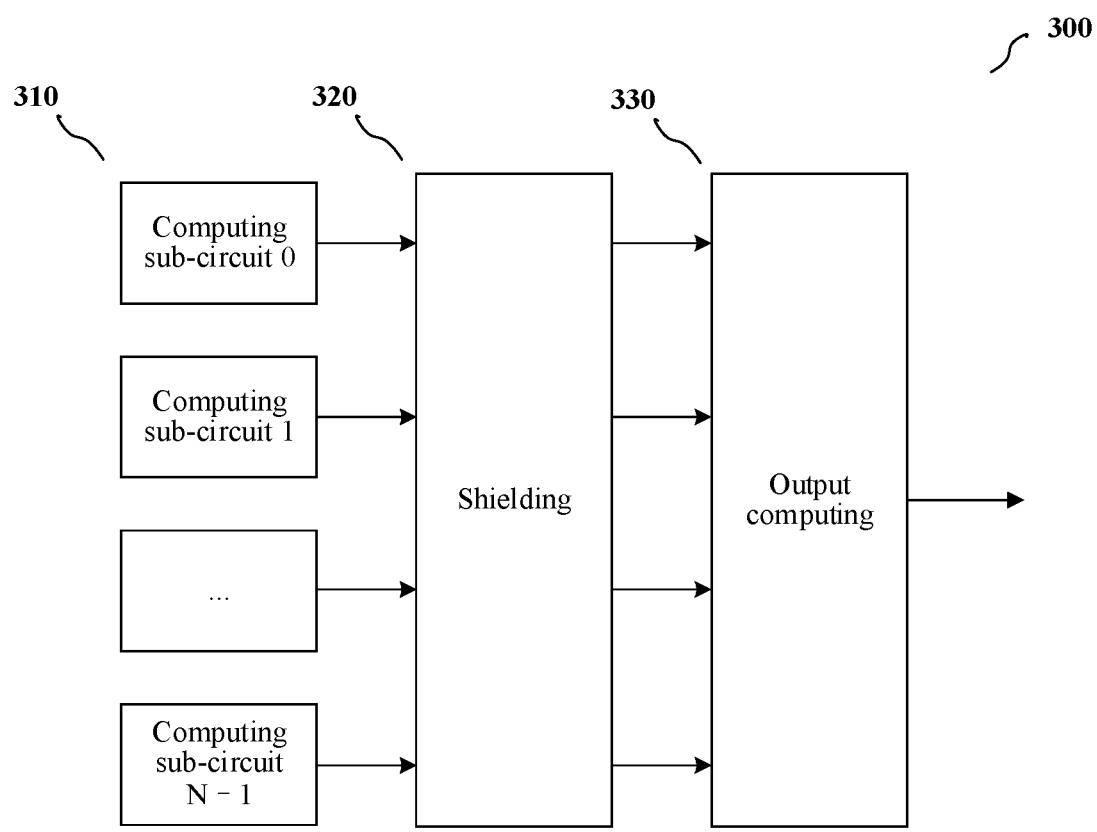
FIG. 3 is a schematic diagram of a first computing circuit according to an embodiment of the present invention.

FIG. 3 shows a first computing circuit 300 according to an embodiment of the present invention. The first computing circuit 300 includes a plurality of computing sub-circuits 310, a shielding circuit 320, and an output computing circuit 330. The plurality of computing sub-circuits 310 include a computing sub-circuit 0, a computing sub-circuit 1, . . . , and a computing sub-circuit N−1. The plurality of computing sub-circuits 310 receive input data, an input parameter, and a control signal output by an input control circuit 202, and perform a logarithmic operation and/or an exponential operation on the input data or intermediate data generated through computing. The plurality of computing sub-circuits 310 may perform parallel computing on the input data and the input parameter, and the input data and the input parameter that are processed in parallel may be vectors or a subset of vectors.

The first computing circuit 300 includes the plurality of computing sub-circuits. Each of the plurality of computing sub-circuits includes a first addition operation circuit, a multiplication operation circuit, a first comparison operation circuit, a first pass-through circuit, and a first nonlinear operation circuit. The first nonlinear operation circuit includes at least one of an exponential operation circuit and a logarithmic operation circuit. The input control circuit 202 receives a first instruction, and generates the control signal according to the first instruction, to control the plurality of computing sub-circuits in the first computing circuit 300 to perform an operation on the input data and the input parameter by using one of or a combination of a plurality of the first addition operation circuit, the multiplication operation circuit, the first comparison operation circuit, the first pass-through circuit, and the first nonlinear operation circuit. The first computing circuit 300 combines an addition operation, a multiplication operation, a comparison operation, a logarithmic operation, and an exponential operation based on the control signal, to implement a more complex operation mode, for example, an operation such as evolution or squaring.

Because the input control circuit may control, by using the first instruction, the first computing circuit to implement one of or a combination of a plurality of a logarithmic operation, an exponential operation, pass-through processing, an addition operation, a comparison operation, and a multiplication operation, a data processing circuit can complete a more complex operation mode, such as a power operation, a division operation, and local summation, so that computing can be performed at more types of neural network layers in the data processing circuit. Accordingly, this reduces a quantity of types of neural network layers that need to be processed by a CPU, and therefore reduces frequency of data exchange between the data processing circuit and the CPU, thereby reducing a delay arising from this and improving computing efficiency for a neural network.

The first addition operation circuit may be an adder, for example, a serial adder, a ripple carry adder, a carry look-ahead adder, or another adder optimized by using a binary design method. The multiplication operation circuit may be a shift summation multiplier, or implement a multiplication operation by using a look-up table (Look-Up Table, LUT). The first comparison operation circuit may be implemented based on different combination logic. The first pass-through circuit may directly output data or a parameter through a conductive circuit such as a conductor or a semiconductor switch, or store data or a parameter by using a storage device such as a register or a latch and output the data or the parameter, or is another data channel providing a communication connection.

The first computing circuit 300 is configured to perform computing on the input data and the input parameter based on the control signal, where the input data includes first input data and second input data. Specifically, the first nonlinear operation circuit is configured to perform a logarithmic operation or an exponential operation on the first input data, and output an operation result; the first pass-through circuit is configured to directly output the first input data; the multiplication operation circuit is configured to perform a multiplication operation on the input parameter and an operation result of the first nonlinear operation circuit, or perform a multiplication operation on the input parameter and a result output by the first pass-through circuit, and output an operation result; the first addition operation circuit is configured to perform addition operation on the operation result of the multiplication operation circuit and the second input data, and output an operation result; and the first comparison operation circuit is configured to perform a comparison operation on the operation result of the multiplication operation circuit and the second input data, and output an operation result. The input control circuit enables, based on the control signal converted from the first instruction, one of the first nonlinear operation circuit and the first pass-through circuit to participate in an operation, and enables one of the first addition operation circuit and the first comparison operation circuit to participate in the operation.

In all the embodiments of the present invention, a base for a logarithmic operation and an exponential operation is 2. However, it should be noted that in all the embodiments of the present invention, a base for a logarithmic operation and an exponential operation may be alternatively another value greater than 0 and not equal to 1.

Figure 4:
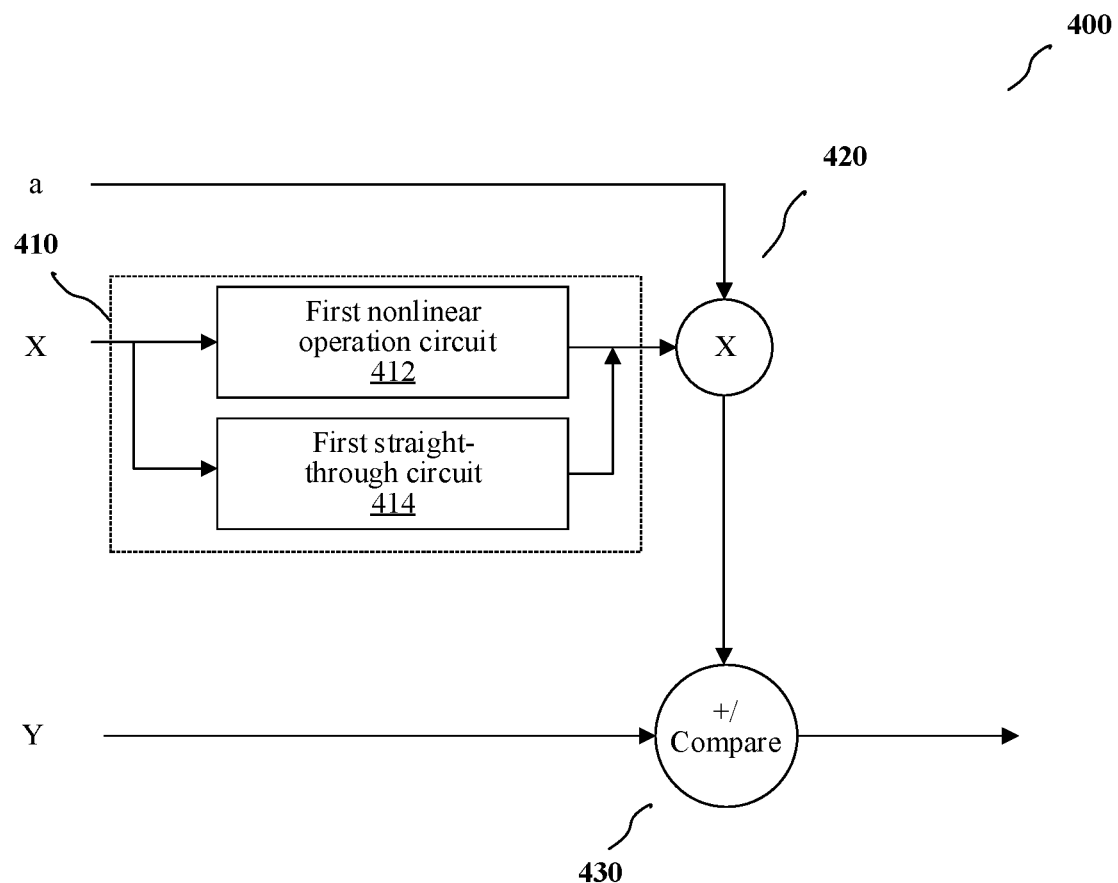
FIG. 4 is a schematic diagram of a computing sub-circuit according to an embodiment of the present invention.

A computing sub-circuit 400 shown in FIG. 4 is a specific implementation of the computing sub-circuit 310 according to an embodiment of the present invention. The computing sub-circuit 400 includes a first conversion circuit 410, a multiplication operation circuit 420, and a summation and comparison circuit 430. The first conversion circuit 410 includes a first nonlinear operation circuit 412 and a first straight-through circuit 414. The first conversion circuit 410 performs an exponential operation or a logarithmic operation on first input data x based on a control signal, or directly outputs x. The multiplication operation circuit 420 multiplies a result output by the first conversion circuit 410 by an input parameter a. The summation and comparison circuit 430 includes a first addition circuit and a first comparison circuit. The summation and comparison circuit 430 performs, based on the control signal, an addition operation or a comparison operation on a result output by the multiplication operation circuit 420 and second input data y.

The first nonlinear operation circuit 412 may include one of or a combination of a plurality of an encoder, a decoder, a shift register, and a look-up table, to perform data conversion between x and $\log_2 x$. For example, the first nonlinear operation circuit 412 includes an exponential operation circuit and a logarithmic operation circuit. The logarithmic operation circuit is a 4-bit-input/2-bit-output encoder, and the exponential operation circuit is a 2-bit-input/4-bit-output decoder. For the logarithmic operation circuit, when input x is 0001, 0010, 0100, and 1000 in a binary representation, that is, 1, 2, 4, and 8 in a decimal representation, values of $\log_2 x$ that are output by the logarithmic operation circuit are 00, 01, 10, and 11 in a binary representation respectively, that is, 0, 1, 2, and 3 in a decimal representation. Therefore, the logarithmic operation circuit implements conversion from x to $\log_2 x$. Likewise, the exponential operation circuit may implement conversion from $\log_2 x$ to x.

The summation and comparison circuit 430 includes a first addition operation circuit and a first comparison operation circuit. Specifically, the summation and comparison circuit 430 may further include a selector. The selector enables, by using a received control signal, the first addition operation circuit or the first comparison operation circuit to perform an addition operation or a comparison operation on a result output by the multiplication operation circuit 420 and the second input data y, and output an operation result.

A working mode of the computing sub-circuit 400 is described by using an example of an operation for obtaining $x^3$ for the data x. The computing sub-circuit 400 needs to perform two computations on the data. In a first computation, the first conversion circuit 410 performs a logarithmic operation on x, where the data y is 0, and the parameter a is 3. In this case, a result output by the first conversion circuit 410 is $\log_2 x$ a result output by the multiplication operation circuit 420 is $3 \log_2 x$, and the summation and comparison circuit 430 performs an addition operation and outputs a result of $3 \log_2 x$, that is, $\log_2 x^3$. In a second computation, the first conversion circuit 410 performs an exponential operation on the input $\log_2 x^3$, where the data y is 0, and the parameter a is 1. In this case, a result output by the first conversion circuit 410 is $x^3$, a result output by the multiplication circuit 420 is $x^3$, and the summation and comparison circuit 430 performs an addition operation and outputs a result of $x^3$.

Figure 5:
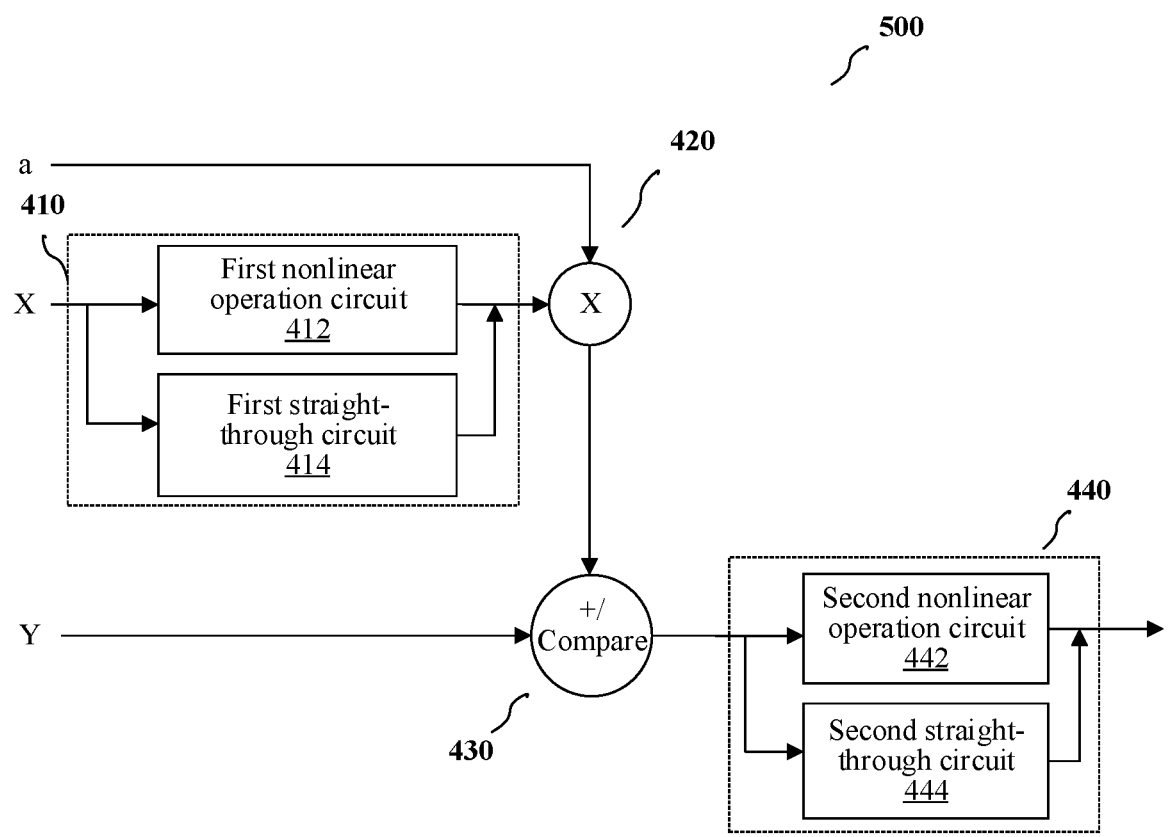
FIG. 5 is a schematic diagram of another computing sub-circuit according to an embodiment of the present invention.

The computing sub-circuit may further include a second nonlinear operation circuit and a second pass-through circuit. The second nonlinear operation circuit includes at least one of the exponential operation circuit and the logarithmic operation circuit. The second pass-through circuit is configured to directly output an operation result of the first addition operation circuit or an operation result of the first comparison operation circuit. The second nonlinear operation circuit is configured to perform a logarithmic operation or an exponential operation on the operation result of the first addition operation circuit or the operation result of the first comparison operation circuit, and output an operation result. The input control circuit enables, based on a control signal converted from a first instruction, one of the second nonlinear operation circuit and the second pass-through circuit to participate in an operation. Similar to the first nonlinear operation circuit 412, the second nonlinear operation circuit may include an encoder, a decoder, a shift register, and a look-up table, to perform data conversion between x and $\log_2 x$. Similar to the first pass-through circuit, the second pass-through circuit may directly output data or a parameter through a conductive circuit such as a conductor or a semiconductor switch, or store data or a parameter by using a storage device such as a register or a latch and output the data or the parameter, or is another data channel providing a communication connection. A computing sub-circuit 500 shown in FIG. 5 is another specific implementation of the computing sub-circuit 310 according to an embodiment of the present invention. A structure of the computing sub-circuit 500 is similar to that of the computing sub-circuit 400. A difference lies in that the computing sub-circuit 500 further includes a second conversion circuit 440. The second conversion circuit 440 includes a second nonlinear operation circuit 442 and a second straight-through circuit 444. The second conversion circuit 440 performs, based on a control signal, an exponential operation or a logarithmic operation on a result output by the summation and comparison circuit 430, or directly outputs the result. By using the first conversion circuit 410 and the second conversion circuit 440, the computing sub-circuit 500 can complete more complex computing at a time. For example, in the foregoing operation for obtaining $x^3$ for x, the second conversion circuit 440 directly performs an exponential operation on $\log_2 x^3$ to obtain $x^3$; however, the computing sub-circuit needs to first cache the result $\log_2 x^3$ of the first computation, and then re-read the result for computing. Therefore, compared with the computing sub-circuit 400, the computing sub-circuit 500 saves time for caching and re-reading the result of the first computation, thereby improving computing efficiency for input data and an input parameter.

Figure 6:
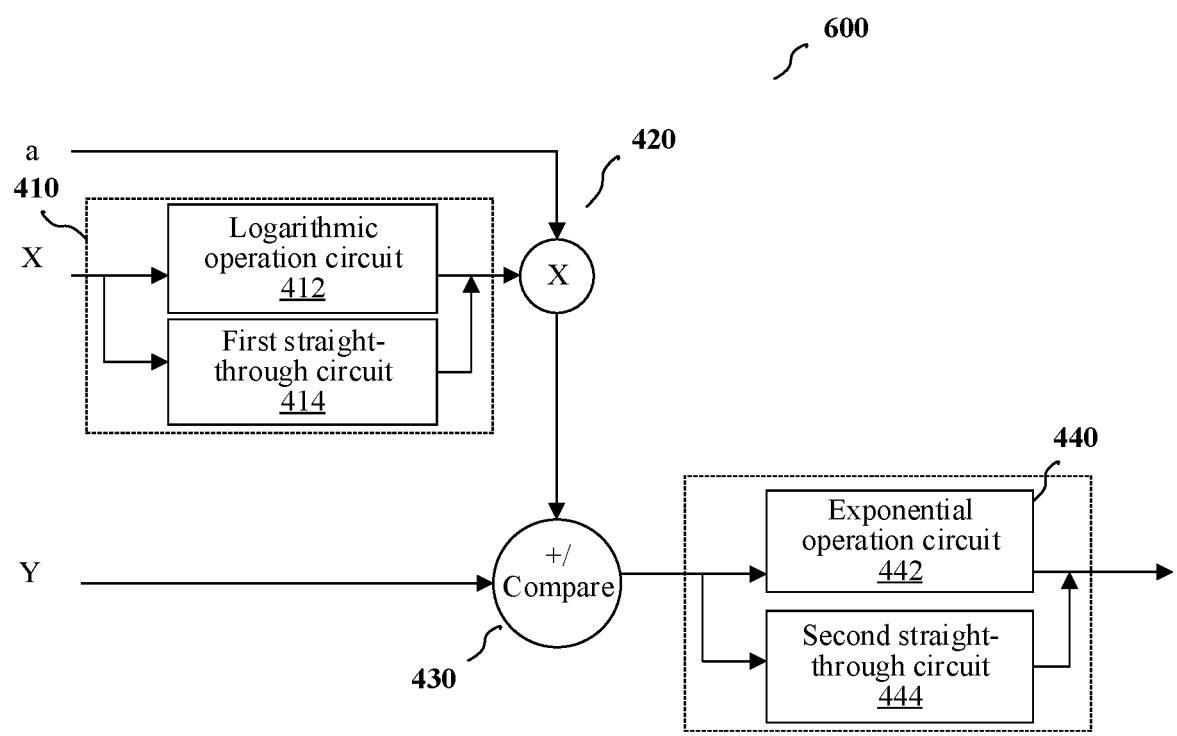
FIG. 6 is a schematic diagram of still another computing sub-circuit according to an embodiment of the present invention.

A computing sub-circuit 600 shown in FIG. 6 is still another specific implementation of the computing sub-circuit 310 according to an embodiment of the present invention. A structure of the computing sub-circuit 600 is similar to that of the computing sub-circuit 400. A difference lies in that the first nonlinear operation circuit 412 is a logarithmic operation circuit, and the second nonlinear operation circuit 442 is an exponential operation circuit. To be specific, the computing sub-circuit 600 performs a logarithmic operation on first input data x or directly outputs x, and performs an exponential operation on a result output by the summation and comparison circuit 430 or directly outputs the result. For commonest computing, for example, to obtain an $n^{th}$ power of x, a logarithmic operation and an exponential operation usually need to be performed sequentially. Therefore, compared with the computing sub-circuit 500, the computing sub-circuit 600 implements commonest computing, while reducing a hardware area of the first conversion circuit 410 and the second conversion circuit 440, and saving hardware resources of the neural network processor 200.

The shielding circuit 320 receives a computing result of the plurality of computing sub-circuits 310, and determines, based on a control signal output by the input control circuit 202, whether to shield a computing result of some of the plurality of computing sub-circuits 310. Some operation results, that are shielded, of the plurality of computing sub-circuits are not transmitted to the output computing circuit 330. For example, when the shielding circuit 320 chooses to shield a computing sub-circuit 1 and a computing sub-circuit 2, values of operation results output by the computing sub-circuit 1 and the computing sub-circuit 2 are 0 after the operation results pass the shielding circuit 320. The shielding circuit 320 may be a selector, or another combination logic circuit with a similar function.

The output computing circuit 330 includes a second addition operation circuit, a second comparison operation circuit, and a third pass-through circuit. The second addition operation circuit is configured to add up a plurality of shielding results and output an operation result. The second comparison operation circuit is configured to compare the plurality of shielding results and output an operation result. The third pass-through circuit is configured to directly output the plurality of shielding results. The input control circuit enables, according to the first instruction, one of the second addition operation circuit, the second comparison operation circuit, and the third pass-through circuit to perform an operation on the plurality of shielding results.

The second addition operation circuit may be an adder, for example, a serial adder, a ripple carry adder, a carry look-ahead adder, or another adder optimized by using a binary design method. The second comparison operation circuit may be implemented based on different combination logic. Similar to the first pass-through circuit, the third pass-through circuit may be a register or a latch, or may be another storage circuit, or another data channel providing a communication connection.

The second addition operation circuit in the output computing circuit 330 may be a tree circuit, including a plurality of levels of parallel adders. An adder at each level adds up every two pieces of data, and a computing result is obtained by the plurality of levels of adders. Likewise, the second comparison operation circuit in the output computing circuit 330 may be a tree circuit, including a plurality of levels of parallel comparators. A comparator at each level compares every two pieces of data, and a computing result is obtained by the plurality of levels of comparators.

A work process of the first computing circuit 300 and the computing sub-circuit 600 of the first computing circuit 300 is described by using an example of identifying a 256×256× 1-bit gray-scale map. Neural network layers that require computing are a convolution layer, a sigmoid layer 1, a pooling layer 1, a sigmoid layer 2, a pooling layer 2, and a fully connected layer.

First, computing is performed on image data at the convolution layer. The image data is converted into a 256×256 first data matrix, where each element represents a value of a pixel. A neural network parameter is converted into a 128×128 second data matrix, where each element represents a neural network parameter obtained through offline training. The first computing circuit 300 includes 128 computing sub-circuits 600 for parallel computing. In the computing at the convolution layer, each sub-matrix with a size of 128×128 in the first data matrix needs to be sequentially multiplied by the second data matrix, an obtained computing result is used as an element in a 129×129 result matrix, and a location of the sub-matrix in the first data matrix corresponds to a location of the computing result in the result matrix. Each multiplication of a sub-matrix in the first data matrix by the second data matrix is equivalent to 129 product operations performed on two vectors with a dimension of 128 each. Computing steps for each product operation on a vector are as follows:

(1) A parameter a of the computing sub-circuit 600 is configured as 1, x is vector data X with a dimension of 128 in the first data matrix, and y is 0. The first conversion circuit 410 performs a logarithmic operation on $x_i$ and outputs $\log_2 x_i$. The multiplication operation circuit 420 outputs $\log_2 x_i$. The summation and comparison circuit 430 performs an addition operation and outputs $\log_2 x_i$. The second conversion circuit 440 directly outputs $\log_2 x_i$.

(2) The shielding circuit 320 does not shield any output, and the output computing circuit 330 directly outputs $\log_2 x_i$. Therefore, a computing result output by the first computing circuit 300 is $\log_2 x_i$.

(3) The parameter a of the computing sub-circuit 600 is configured as 1, x is vector data $y_i$ with a dimension of 128 in the second data matrix, and y is the computing result $\log_2 x_i$ in step (2). The first conversion circuit 410 performs a logarithmic operation on $y_i$ and outputs $\log_2 y_i$. The multiplication operation circuit 420 outputs to $\log_2 y_i$. The summation and comparison circuit 430 performs an addition operation on $\log_2 x_i$ and $\log_2 y_i$, and outputs $\log_2 x_i y_i$. The second conversion circuit 440 performs an exponential operation on $\log_2 x_i y_i$, to obtain a result of $x_i y_i$.

(4) The shielding circuit 320 does not shield any output, and the output computing circuit 330 adds up results $x_i y_i$ output by the 128 computing sub-circuit 600. Therefore, a computing result output by the first computing circuit 300 is $\Sigma_{i=1}^{128} x_i y_i$.

After the computing at the convolution layer is completed, computing at the sigmoid layer 1 is performed by using the computing result for the convolution layer, that is, a 128×128 matrix, as input. At the sigmoid layer 1, a sigmoid function operation is performed on each element in the matrix, that is, $$S(x) = \frac{1}{1+e^{-x}},$$

to finally obtain a 129×129 matrix. The first computing circuit 300 needs to perform 128 operations on the 128×128 matrix, and input of each operation is a vector with a dimension of 128. Computing steps for computing for each vector are as follows:

(1) A parameter a of the computing sub-circuit 400 is configured as $-\log_2 e$, x is vector data $x_i$ with a dimension of 128, and y is 0. The first conversion circuit 410 directly outputs $x_i$. The multiplication operation circuit 420 performs a multiplication operation on $-\log_2 e$ and $x_i$, to obtain a result of $\log_2 e^{-x_i}$. The summation and comparison circuit 430 performs an addition operation and outputs $\log_2 e^{-x_i}$. The second conversion circuit 440 performs an exponential operation on $\log_2 e^{-x_i}$, to obtain a result of $e^{-x_i}$.

(2) The shielding circuit 320 does not shield any output, and the output computing circuit 330 directly outputs $e^{-x_i}$. Therefore, a computing result output by the first computing circuit 300 is $e^{-x_i}$.

(3) The parameter a of the computing sub-circuit 400 is configured as 1, x is the computing result $e^{-x_i}$ in step (2), and y is 1. The first nonlinear operation circuit 410 directly outputs $e^{-x_i}$. The multiplication operation circuit 420 outputs $e^{-x_i}$. The summation and comparison circuit 430 performs an addition operation on $e^{-x_i}$ and 1, to obtain a result of $1+e^{-x_i}$. The second conversion circuit 440 directly outputs $1+e^{-x_i}$.

(4) The shielding circuit 320 does not shield any output, and the output computing circuit 330 is configured to directly output $1+e^{-x_i}$. Therefore, a computing result output by the first computing circuit 300 is $1+e^{-x_i}$.

(5) The parameter a of the computing sub-circuit 400 is configured as $-1$, x is the computing result $1+e^{-x_i}$ in step (4), and y is 0. The first conversion circuit 410 performs a logarithmic operation on $1+e^{-x_i}$, to obtain a result of $\log_2(1+e^{-x_i})$. The multiplication operation circuit 420 performs a multiplication operation on $1+e^{-x_i}$ and $-1$, to obtain a result of $$\log_2(1+e^{-x_i})^{-1}.$$

The summation and comparison circuit 430 outputs $\log_2(1+e^{-x_i})^{-1}$. The second conversion circuit 440 performs an exponential operation on $$\log_2(1+e^{-x_i})^{-1},$$

to obtain a result of $$\frac{1}{1+e^{-x_i}}.$$

(6) The shielding circuit 320 does not shield any output, and the output computing circuit 330 directly outputs $$\frac{1}{1+e^{-x_i}}.$$

Therefore, a computing result output by the first computing circuit 300 is $$\frac{1}{1+e^{-x_i}}.$$

After the computing at the convolution layer and the sigmoid layer 1 is completed, computing is then sequentially performed at the pooling layer 1, the sigmoid layer 2, the pooling layer 2, and the fully connected layer, to finally output a vector representing an identification result.

In computing for a neural network, a computing amount required for a multiplication and accumulation operation accounts for a relatively large proportion, and a computing amount required for a complex operation, such as a power operation, a division operation, and local summation, accounts for a relatively small proportion. For a multiplication and accumulation operation on data, the neural network processor 200 may be implemented by using a simpler circuit, without performing an exponential operation or a logarithmic operation on the data. Performing a multiplication and accumulation operation by using the first computing circuit 300 wastes hardware resources and computing time. Therefore, the embodiments of the present invention provide the second computing circuit that is dedicated for massive high-speed multiplication and accumulation computing, and the first computing circuit 300 is configured to perform complex computing that cannot be processed by the second computing circuit, such as a power operation, a division operation, and local summation, to fully utilize hardware resources and improve computing efficiency of the neural network processor 200.

Figure 7:
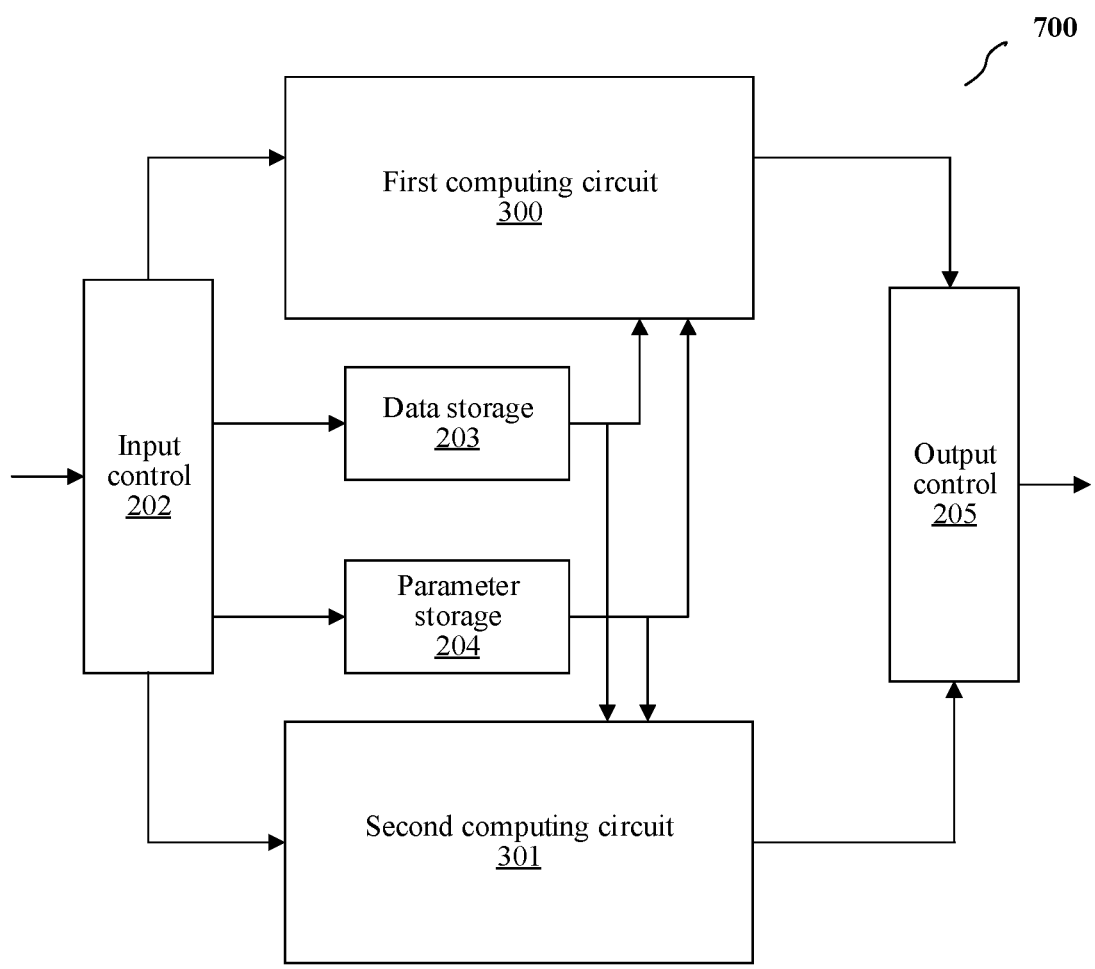
FIG. 7 is a schematic diagram of another neural network processor according to an embodiment of the present invention.

FIG. 7 shows a neural network 700 according to an embodiment of the present invention. A structure of the neural network processor 700 is similar to that of the neural network processor 200. A difference is that the neural network processor 700 further includes a second computing circuit 301, configured to perform a multiplication and accumulation operation. In an implementation, the input control circuit 202 caches the received input data and input parameter to the data storage circuit 203 and the parameter storage circuit 204 respectively, and controls the second computing circuit 301 to read the input data in the data storage circuit 203 and the input parameter in the parameter storage circuit 204. In another implementation, the input control circuit 202 directly controls the second computing circuit 301 to read the input data and the input parameter in the memory 103. The input control circuit 202 may further convert the second instruction into a control signal by using an instruction parsing circuit included in the input control circuit 202, to control the second computing circuit 301 to perform computing by using a neural network layer computing mode corresponding to the second instruction.

Specifically, the second computing circuit 301 receives a control signal generated by the input control circuit 202, and reads the data that needs to be calculated in the data storage circuit 203 and the parameter in the parameter storage circuit 204. The second operation result obtained after the computing is buffered by the output control circuit 205 and is controlled for output. In the neural network processor 500, the second computing circuit 320 mainly completes a multiplication and accumulation operation, for example, computing of a convolution layer and a fully connected layer in a neural network; the first computing circuit 300 mainly completes complex operations such as a power operation, a division operation, and local summation by performing a logarithmic operation and an exponential operation on data, for example, computing of an LRN layer and a normalization layer in the neural network. The second computing circuit 301 is a computing circuit commonly used in a neural network processor in the related art, and includes a plurality of accumulators and a plurality of multipliers, to implement a multiplication operation between matrices, for example, a matrix operation unit disclosed in the U.S. Pat. No. 9,710,748 of Google.

In the neural network processor 700, the input control circuit 202 receives a second instruction from a user and converts the second instruction into a control signal, to control the first computing circuit 300 and the second computing circuit 301. Specifically, the input control circuit 202 determines, by determining a type of a current neural network layer, whether to use the first computing circuit 300 or the second computing circuit 301 to complete computing of the current neural network layer. If the current neural network layer is the convolution layer or the fully connected layer, the input control circuit 202 outputs a generated control signal to the second computing circuit 301, and the second computing circuit 301 reads the input data and the input parameter, and calculates and outputs the second operation result. If the current neural network layer is not the convolution layer or the fully connected layer, the input control circuit 202 outputs a generated control signal to the first computing circuit 300, and the first computing circuit 300 reads the input data and the input parameter, and calculates and outputs a first operation result.

Figure 8A:
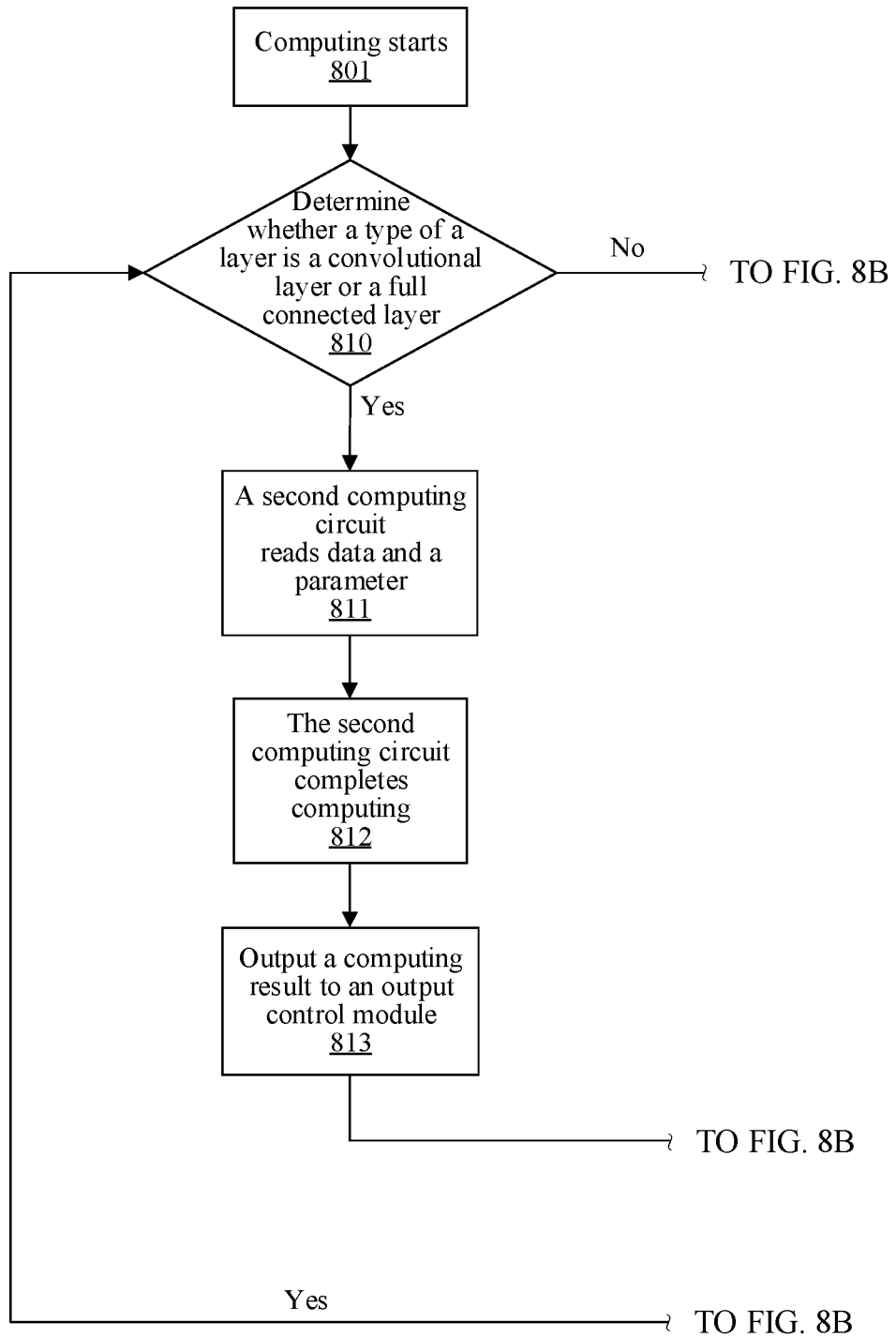
FIG. 8A and FIG. 8B are a work flowchart of a neural network processor according to an embodiment of the present invention.
Figure 8B:
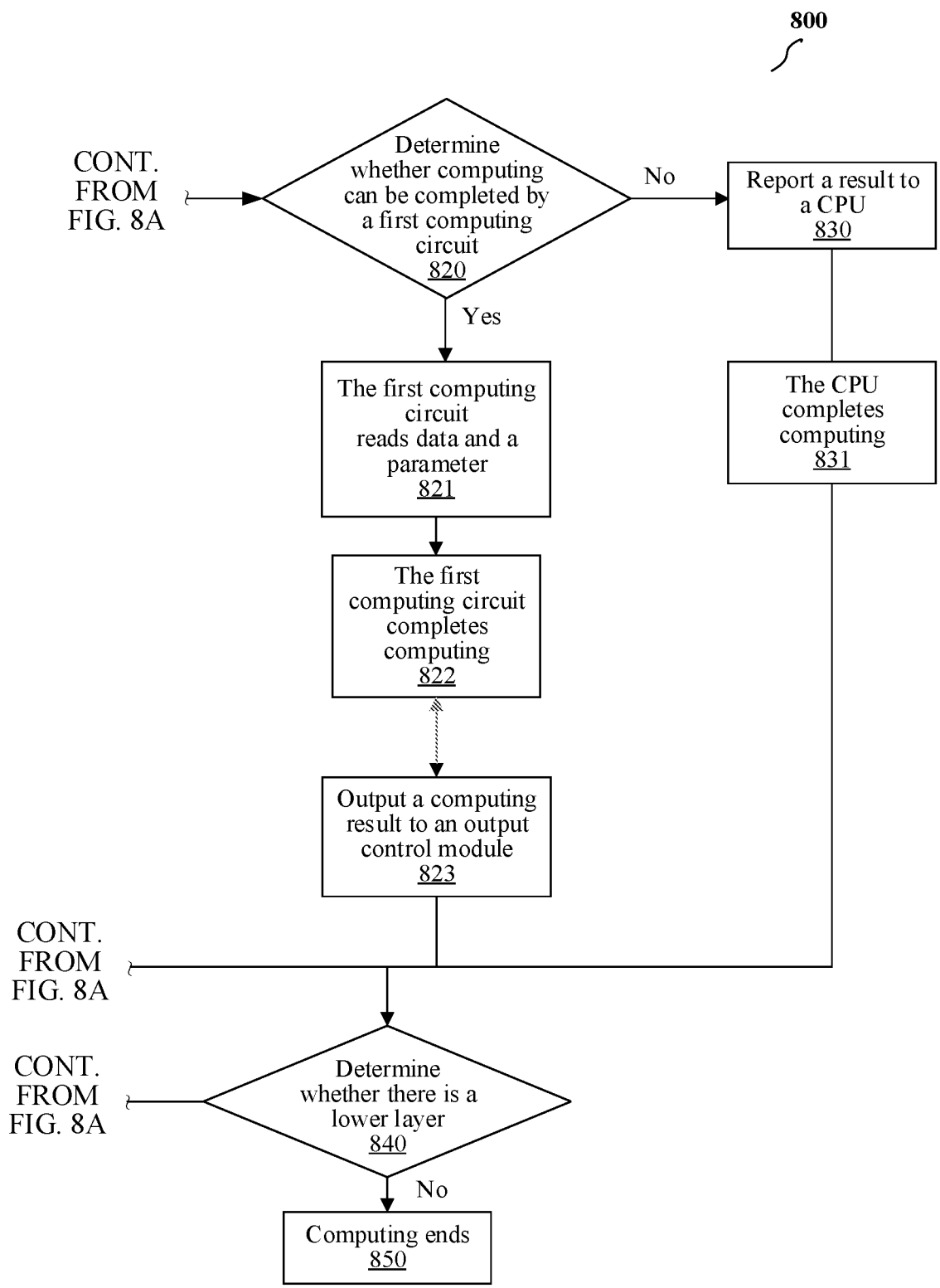

FIG. 8 shows a work flowchart 800 of a neural network processor 700 according to an embodiment of the present invention. The neural network processor 500 is started by the bus 101 and starts computing (step 801). The input control circuit 202 determines, based on a received instruction, whether a type of a current neural network layer is a convolution layer or a fully connected layer (step 810), and if yes, the input control circuit 202 controls the second computing circuit 301 to read the input data and the input parameter (step 811), wait for the second computing circuit 301 to complete computing (step 812), and output the second operation result to the output control circuit 205 (step 813). If the type of the current neural network layer is not a convolution layer or a fully connected layer, the input control circuit 202 further determines whether the current neural network layer can be calculated by the first computing circuit 300 (step 820). If yes, the input control circuit 202 controls the first computing circuit 300 to read the input data and the input parameter (step 821), wait for the first computation circuit 300 to complete computation (step 822), and output the first computation result to the output control circuit (step 823). If the current neural network layer cannot be calculated by the first computing circuit 300 (step 820), the determining result, the input data, and the input parameter are reported to a CPU (step 830), and the CPU completes computing (step 831). After step 813, step 823, and step 831 are completed, the input control circuit 202 determines whether there is a next-layer neural network that needs to be calculated (step 840), and if yes, jumps to step 810, or if no, jumps to step 850 and ends computing.

Figure 9:
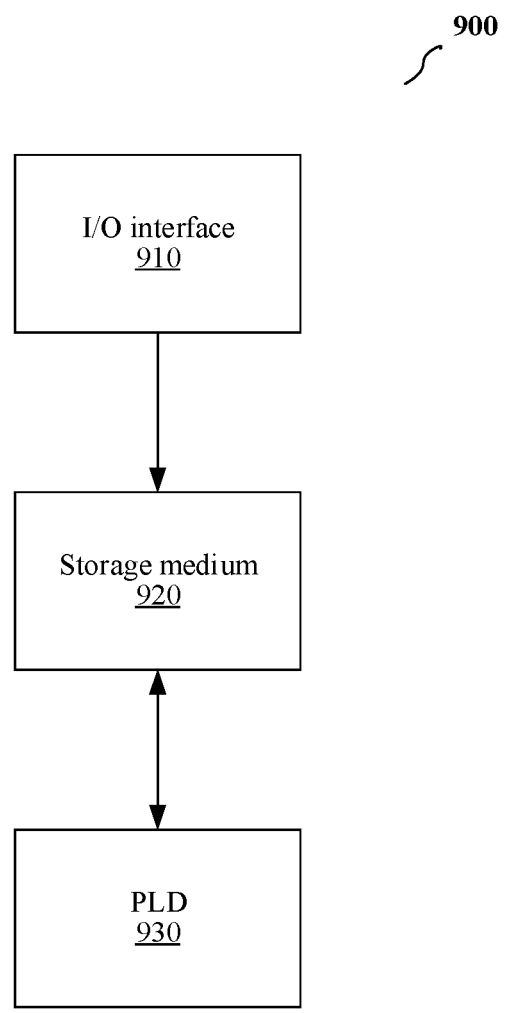
FIG. 9 is a schematic diagram of another electronic device for a neural network according to an embodiment of the present invention.

FIG. 9 shows another electronic device 900 used for a neural network, including an I/O interface 910, a storage medium 920, and a PLD 930. The electronic device 900 reads, by using the IO interface 910, configuration data output by another device. For example, the electronic device 900 reads, from a PC by using a JTAG (Joint Test Action Group, joint test action group) interface, a design netlist obtained after layout and cabling. The storage medium 920 may include a RAM, a ROM, or a combination thereof, and is configured to store read configuration data. The PLD 930 may be an FPGA or another programmable logic device. The storage medium 920 and the PLD 930 may perform bidirectional data transmission. The PLD 930 reads the configuration data from the storage medium 920, and configures a plurality of logical blocks in the PLD 930 based on the configuration data, for example, configures a connection manner of a plurality of lookup tables in the configuration data, to form the neural network processor 200 or the neural network processor 700. The storage medium 920 may further store data used for computing, for example, input data and an input parameter, and store a computing result of the PLD 930.

The circuit provided in this embodiment of the present invention may be stored in a storage medium in a form of a source file. Specifically, the source file may be functional blocks described in a hardware description language, and is stored in a form of source code, for example, a software IP core. The source file may alternatively be the foregoing functional blocks on which wiring is performed. Some specific signals in these function blocks are wired, or specific wiring resources are allocated to meet a specific time sequence requirement, and are stored in a form of a netlist, for example, a fixed IP core. The functional blocks in the source file may be used as an independent system, or may be coupled to another function module, and then are converted into the neural network processor 200 or the neural network processor 700 by a hardware design tool. A process of the conversion includes synthesizing the source file by using a logic synthesis tool, to form a gate-level netlist, and use a layout and wiring tool to perform layout and wiring on the gate-level netlist, to form a specific circuit structure.

A person skilled in the art should understand that the embodiments of the present invention may be provided as a method, a system, or a computer program product. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A data processing circuit, comprising:
a first computing circuit and an input control circuit, wherein
the first computing circuit comprises one or more computing sub-circuits, each of the one or more computing sub-circuits comprises a first addition operation circuit, a multiplication operation circuit, a first comparison operation circuit, a first pass-through circuit, and a first nonlinear operation circuit, and the first nonlinear operation circuit comprises at least one of an exponential operation circuit or a logarithmic operation circuit;
the input control circuit is configured to control the first computing circuit to read input data and an input parameter; and
the input control circuit is further configured to receive a first instruction, and control, according to the first instruction, the one or more computing sub-circuits in the first computing circuit to perform a data operation on the input data and the input parameter by using one of or a combination of a plurality of the first addition operation circuit, the multiplication operation circuit, the first comparison operation circuit, the first pass-through circuit, and the first nonlinear operation circuit, and output a first operation result,
wherein the exponential operation circuit is a decoder.

2. The data processing circuit according to claim 1, wherein the input data comprises first input data and second input data;
the first nonlinear operation circuit is configured to perform a logarithmic operation or an exponential operation on the first input data;
the first pass-through circuit is configured to directly output the first input data;
the multiplication operation circuit is configured to perform a multiplication operation on the input parameter and an operation result of the first nonlinear operation circuit, or perform a multiplication operation on the input parameter and a result output by the first pass-through circuit;
the first addition operation circuit is configured to perform an addition operation on an operation result of the multiplication operation circuit and the second input data;
the first comparison operation circuit is configured to perform a comparison operation on the operation result of the multiplication operation circuit and the second input data; and
the input control circuit is configured to enable, according to the first instruction, one of the first nonlinear operation circuit and the first pass-through circuit to participate in the data operation, enable the multiplication operation circuit to participate in the data operation, and enable one of the first addition operation circuit and the first comparison operation circuit to participate in the data operation.

3. The data processing circuit according to claim 2, wherein each computing sub-circuit further comprises a second nonlinear operation circuit and a second pass-through circuit, wherein
the second nonlinear operation circuit comprises at least one of the exponential operation circuit and the logarithmic operation circuit;

the second pass-through circuit is configured to directly output an operation result of the first addition operation circuit or an operation result of the first comparison operation circuit;

the second nonlinear operation circuit is configured to perform a logarithmic operation or an exponential operation on the operation result of the first addition operation circuit or the operation result of the first comparison operation circuit; and the input control circuit is further configured to enable, according to the first instruction, one of the second nonlinear operation circuit and the second pass-through circuit to participate in the data operation.

4. The data processing circuit according to claim 3, wherein the first nonlinear operation circuit is the logarithmic operation circuit, and the second nonlinear operation circuit is the exponential operation circuit.

5. The data processing circuit according to claim 1, wherein the logarithmic operation circuit is an encoder.

6. The data processing circuit according to claim 1, wherein the first computing circuit further comprises a shielding circuit, the shielding circuit being configured to: receive an operation result of the one or more computing sub-circuits under control of the input control circuit, perform shielding processing on the operation result, and output the operation result of the one or more computing sub-circuits that is obtained through the shielding processing.

7. The data processing circuit according to claim 6, wherein the shielding circuit is a selector.

8. The data processing circuit according to claim 6, wherein the first computing circuit further comprises an output computing circuit, the output computing circuit comprising a second addition operation circuit, a second comparison operation circuit, and a third pass-through circuit, wherein the second addition operation circuit is configured to perform an addition operation on the result output by the shielding circuit, and output an addition operation result;

the second comparison operation circuit is configured to perform a comparison operation on the result output by the shielding circuit, and output a comparison operation result;

the third pass-through circuit is configured to directly output the result output by the shielding circuit; and the input control circuit is further configured to enable, according to the first instruction, one of the second addition operation circuit, the second comparison operation circuit, and the third pass-through circuit to process the result output by the shielding circuit.

9. The data processing circuit according to claim 1, wherein the data processing circuit further comprises:

a data caching circuit and a parameter caching circuit, wherein the data caching circuit is configured to cache the input data and output the input data to the first computing circuit; and the parameter caching circuit is configured to cache the input parameter and output the input parameter to the first computing circuit.

10. The data processing circuit according to claim 1, wherein the data processing circuit further comprises an output control circuit, the output control circuit being configured to cache the first operation result output by the first computing circuit, and output the first operation result.

11. The data processing circuit according to claim 10, wherein the data processing circuit further comprises a second computing circuit, wherein the second computing circuit is used for a multiplication and accumulation operation, wherein the input control circuit is further configured to control the second computing circuit to read the input data and the input parameter; the input control circuit is further configured to receive a second instruction, and control, according to the second instruction, the second computing circuit to perform the multiplication and accumulation operation and output a second operation result; and the output control circuit is further configured to cache the second operation result output by the second computing circuit, and output the second operation result.

12. A data processing apparatus, comprising a programmable logic device and a storage device, wherein the storage device is configured to store configuration data, the programmable logic device is configured to read the configuration data, and configure, based on the configuration data, a plurality of logical blocks in the programmable logic device, and the plurality of logical blocks are configured as comprising a first computing circuit and an input control circuit, wherein the first computing circuit comprises one or more computing sub-circuits, each of the one or more computing sub-circuits comprises a first addition operation circuit, a multiplication operation circuit, a first comparison operation circuit, a first pass-through circuit, and a first nonlinear operation circuit, and the first nonlinear operation circuit comprises at least one of an exponential operation circuit and a logarithmic operation circuit;

the input control circuit is configured to control the first computing circuit to read input data and an input parameter; and the input control circuit is further configured to receive a first instruction, and control, according to the first instruction, the one or more computing sub-circuits in the first computing circuit to perform a data operation on the input data and the input parameter by using one of or a combination of a plurality of the first addition operation circuit, the multiplication operation circuit, the first comparison operation circuit, the first pass-through circuit, and the first nonlinear operation circuit, and output a first operation result, wherein the exponential operation circuit is a decoder.

13. The data processing apparatus according to claim 12, wherein the input data comprises first input data and second input data;

the first nonlinear operation circuit is configured to perform a logarithmic operation or an exponential operation on the first input data;

the first pass-through circuit is configured to directly output the first input data;

the multiplication operation circuit is configured to perform a multiplication operation on the input parameter and an operation result of the first nonlinear operation circuit, or perform a multiplication operation on the input parameter and a result output by the first pass-through circuit;

the first addition operation circuit is configured to perform an addition operation on an operation result of the multiplication operation circuit and the second input data;

the first comparison operation circuit is configured to perform a comparison operation on the operation result of the multiplication operation circuit and the second input data; and the input control circuit is configured to enable, according to the first instruction, one of the first nonlinear operation circuit and the first pass-through circuit to participate in the data operation, enable the multiplication operation circuit to participate in the data operation, and enable one of the first addition operation circuit and the first comparison operation circuit to participate in the data operation.

14. The data processing apparatus according to claim 13, wherein each computing sub-circuit further comprises a second nonlinear operation circuit and a second pass-through circuit, wherein the second nonlinear operation circuit comprises at least one of the exponential operation circuit and the logarithmic operation circuit;

the second pass-through circuit is configured to directly output an operation result of the first addition operation circuit or an operation result of the first comparison operation circuit;

the second nonlinear operation circuit is configured to perform a logarithmic operation or an exponential operation on the operation result of the first addition operation circuit or the operation result of the first comparison operation circuit; and the input control circuit is further configured to enable, according to the first instruction, one of the second nonlinear operation circuit and the second pass-through circuit to participate in the data operation.

15. The data processing apparatus according to claim 14, wherein the first nonlinear operation circuit is the logarithmic operation circuit, and the second nonlinear operation circuit is the exponential operation circuit.

16. The data processing apparatus according to claim 12, wherein the logarithmic operation circuit is an encoder.

17. The data processing apparatus according to claim 12, wherein the first computing circuit further comprises a shielding circuit, the shielding circuit being configured to: receive an operation result of the one or more computing sub-circuits under control of the input control circuit, perform shielding on the operation result, and output the operation result of the one or more computing sub-circuits that is obtained through shielding processing.

18. The data processing apparatus according to claim 17, wherein the shielding circuit is a selector.

* * * * *